United States Patent [19]

Yamamoto et al.

[11] 4,358,264
[45] Nov. 9, 1982

[54] CENTRIFUGAL MOLDING APPARATUS FOR MANUFACTURING COMPOSITE MATERIAL PIPES

[75] Inventors: Masahiko Yamamoto, Nishinomiya; Yoshinori Nishino, Yamato Takada; Masao Wada, Sakurai; Tomio Ebisu, Osaka, all of Japan

[73] Assignee: Hitachi Shipbuilding & Engineering Company Limited, Osaka, Japan

[21] Appl. No.: 245,034

[22] Filed: Mar. 18, 1981

[30] Foreign Application Priority Data

Mar. 25, 1980 [JP] Japan ............................ 55-38566
Apr. 4, 1980 [JP] Japan ............................ 55-45034
Apr. 4, 1980 [JP] Japan ............................ 55-46294

[51] Int. Cl.³ ................... B29C 5/04; B29D 23/08
[52] U.S. Cl. ................................ 425/425; 264/311; 425/436 R; 425/441; 425/460
[58] Field of Search ........................ 264/309–311, 264/255, 267, 270; 425/202, 90, 91, 92, 96, 101, 103, 106, 224, 329, 365, 426, 435, 460, 471, 325, 262, 441; 118/315, 317

[56] References Cited

U.S. PATENT DOCUMENTS

| Re. 25,587 | 6/1964 | Wiltshire | 264/311 |
| 2,829,006 | 4/1958 | Johansson | 118/315 |
| 2,994,919 | 8/1961 | Schafer et al. | 425/446 |
| 3,012,922 | 12/1961 | Wiltshire | 264/114 |
| 3,108,348 | 10/1963 | Schultz | 425/262 |
| 3,150,219 | 9/1964 | Schmidt | 264/258 |
| 3,232,812 | 2/1966 | Lorentz et al. | 156/293 |
| 3,676,197 | 7/1972 | Harrison et al. | 118/315 |
| 3,768,943 | 10/1973 | Malhart | 425/435 |
| 3,788,916 | 1/1974 | Gadelius | 425/441 |
| 3,810,441 | 5/1974 | Padgett et al. | 425/262 |
| 3,930,061 | 12/1975 | Sharfenberger | 264/309 |
| 4,123,414 | 10/1978 | Milette | 264/309 |

FOREIGN PATENT DOCUMENTS

2040784 of 1969 France.
1418091 12/1975 United Kingdom ............... 264/309

Primary Examiner—Willard E. Hoag
Attorney, Agent, or Firm—Joseph W. Farley

[57] ABSTRACT

A centrifugal molding apparatus for manufacturing composite material pipes comprising a rotary mold and operating arm means extensible into and retractable from the rotary mold; the operating arm means having, in sequence from the front end thereof, a press roll portion for uniformalizing the interior of a pipe being molded, a first resin-liquid supply portion, a second resin-liquid supply portion, a chopped-strand supply portion, a third resin-liquid supply portion, a sand smoothing portion for smoothing sand supplied on to resin liquids, a sand supply portion, and a roving supply portion.

According to the invention, the operating arm means have various functions, and by causing them to extend into and retract from the rotary mold one or more times it is possible to mold various kinds of composite material pipes efficiently.

10 Claims, 30 Drawing Figures

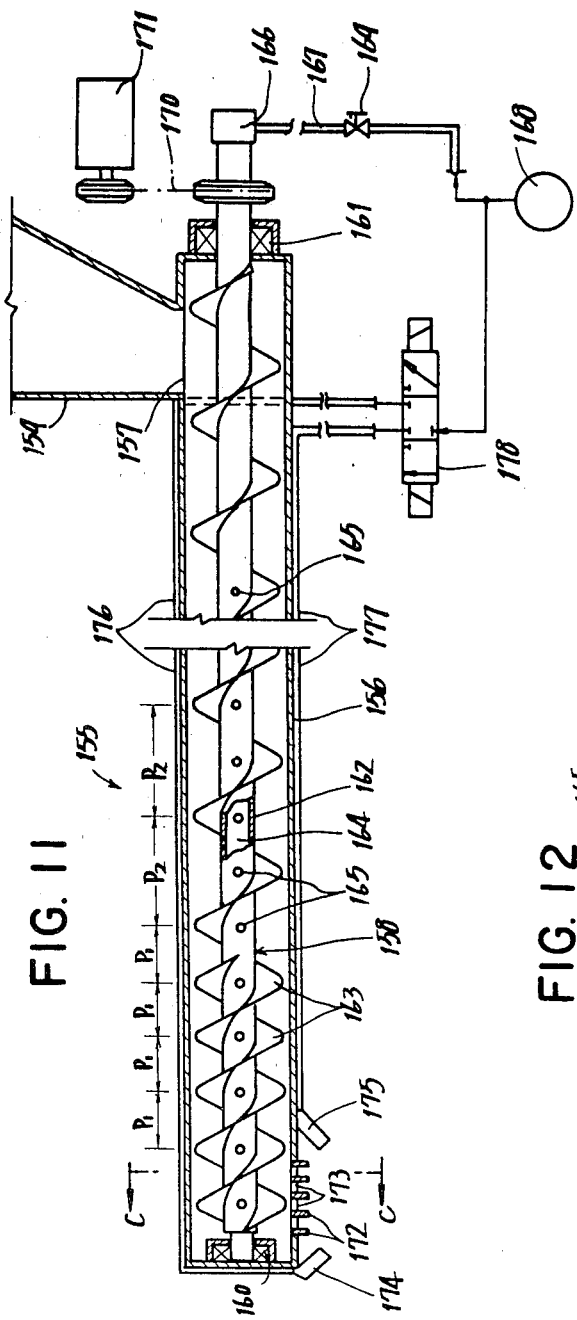
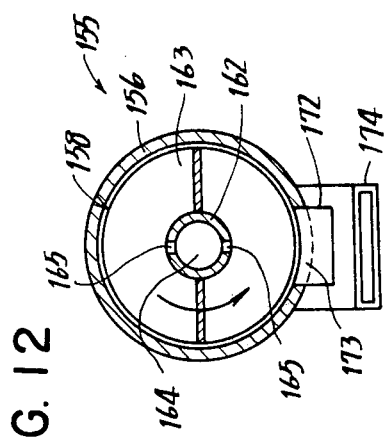
FIG. 11
FIG. 12

CENTRIFUGAL MOLDING APPARATUS FOR MANUFACTURING COMPOSITE MATERIAL PIPES

The present invention relates to a centrifugal molding apparatus for manufacturing composite materials pipes and more particularly to operating arm means having various functions for use in such centrifugal molding apparatus.

Centrifugal molding of composite material pipes involves rotating a rotary mold, pouring various kinds of molding materials such as resin liquids, chopped strand (reinforcing fiber), and sand suitably into the mold while maintaining the rotation of the mold in order, and meanwhile, smoothing the sand supplied and uniformalizing with a press roll the interior of the pipe being molded, before a final form of molded pipe is obtained. Conventionally, these operations are carried out at a number of separate stages employing separate apparatuses, or at most, at a smaller number of stages employing, in combination, separate apparatuses, each adapted to perform a few of such operations in one operation. As such, conventional centrifugal molding operation for manufacture of composite material pipes has been inefficient.

This invention is made in view of such difficulty with the prior-art apparatuses. Accordingly, the object of the invention is to provide a centrifugal molding apparatus for manufacturing composite material pipes, which can effectively produce resin pipes, mortar pipes, composite material pipes and the like, with or without faucet.

In order to attain this object, the present invention provides a centrifugal molding apparatus for manufacturing composite material pipes comprising a rotary mold and operating arm means protrudable and retractable relative to said rotary mold, said operating arm means having, in sequence from the front end thereof, a press roll portion for uniformalizing the interior of a pipe being molded, a first resin-liquid supply portion, a second resin-liquid supply portion, a chopped-strand supply portion, a third resin-liquid supply portion, a sand smoothing portion for smoothing sand supplied on to resin liquid, a sand supply portion, and a roving supply portion.

Since the operating arm means have these different functions, it is possible to mold various different types of composite material pipes efficiently by reciprocally moving the individual component arm portions one or more times for protrusion into and retraction from the rotating mold.

Accordingly to one aspect of the invention, each of said three resin-liquid supply portions is provided with a resin feed nozzle, which has, centrally on its end, a first resin-liquid jet portion, and has an air jet portion outside the periphery of said jet portion and further a second resin-liquid jet portion outside the periphery of said air jet portion. The resin feed nozzle also has, between said air jet portion and said second resin-liquid jet portion, an annular groove having an inverted V profile.

By providing such nozzle it is possible to prevent such trouble that, when resin-liquid supply is stopped, droplets of the resin liquids which have passed through the first and second resin-liquid jet portions spread along the surface of the nozzle end to coalesce and the so coalesced droplets become hardened to clog and jam the orifices of the two jet portions, because an air curtain formed by the air from the air jet portion, coupled with the presence of the groove, inhibits the spread of such droplets.

Other features and advantages of the invention will become apparent from the following description of a preferred embodiment with reference to the accompanying drawings in which:

FIG. 11 is a longitudinal view of a sand feeding conveyer means;

FIG. 12 is a sectional view taken along line C—C in FIG. 11;

Figure 29:
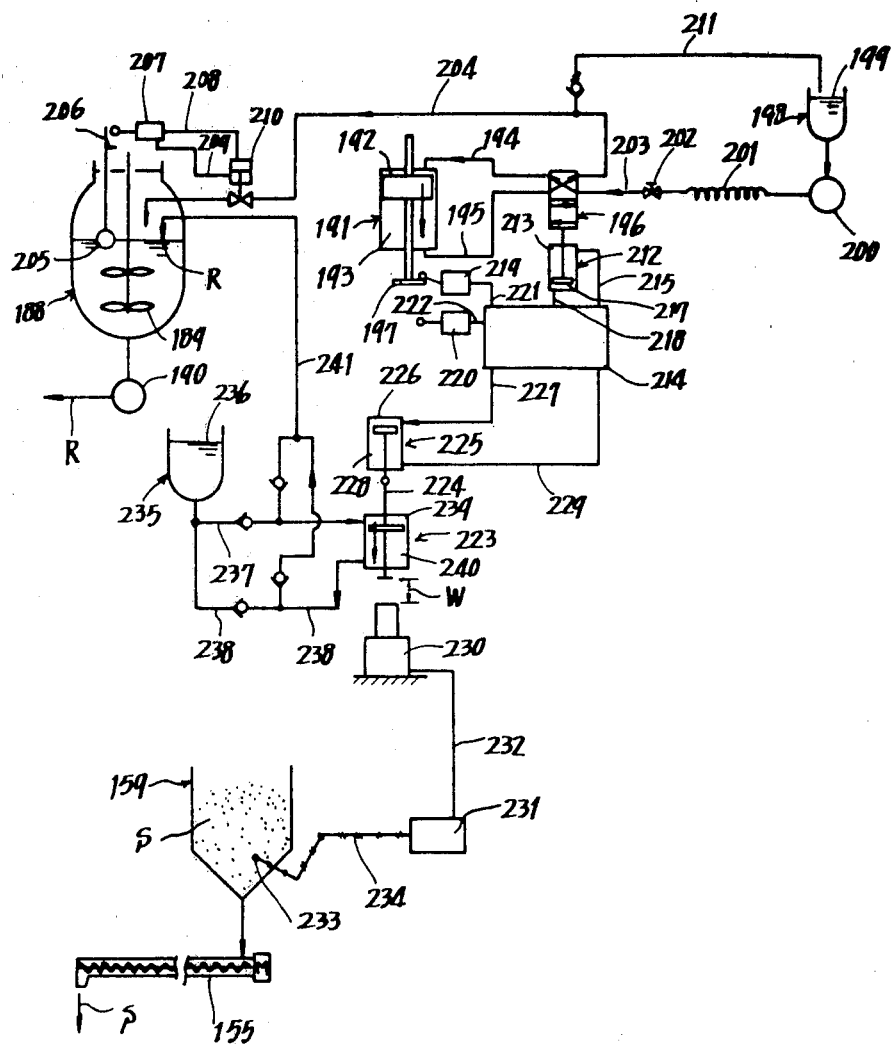
Figure 30:
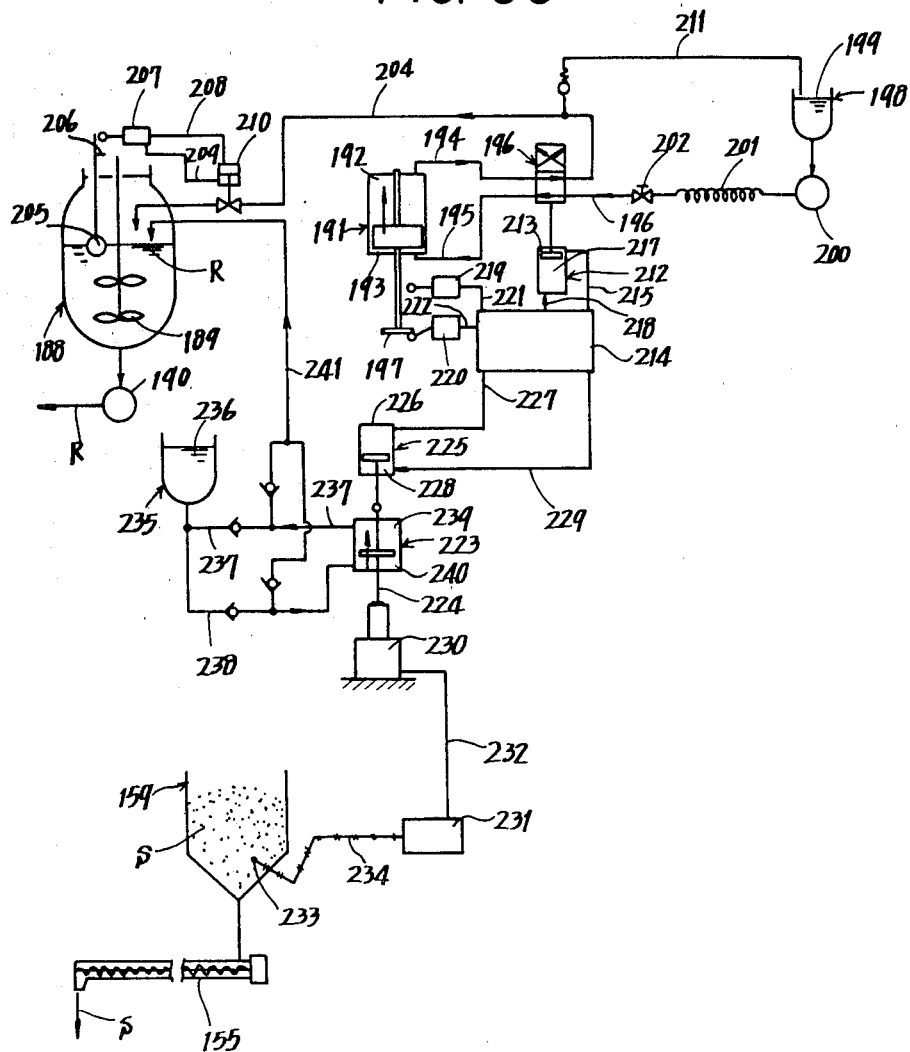

FIGS. 18 to 28, inclusive, are schematic illustrations of assistance in explaining the sequence of operations of said operating arm means employed in manufacturing a composite material pipe;

FIGS. 29 and 30 are schematic diagrams showing a system for preparation of resin liquids.

Figure 1:
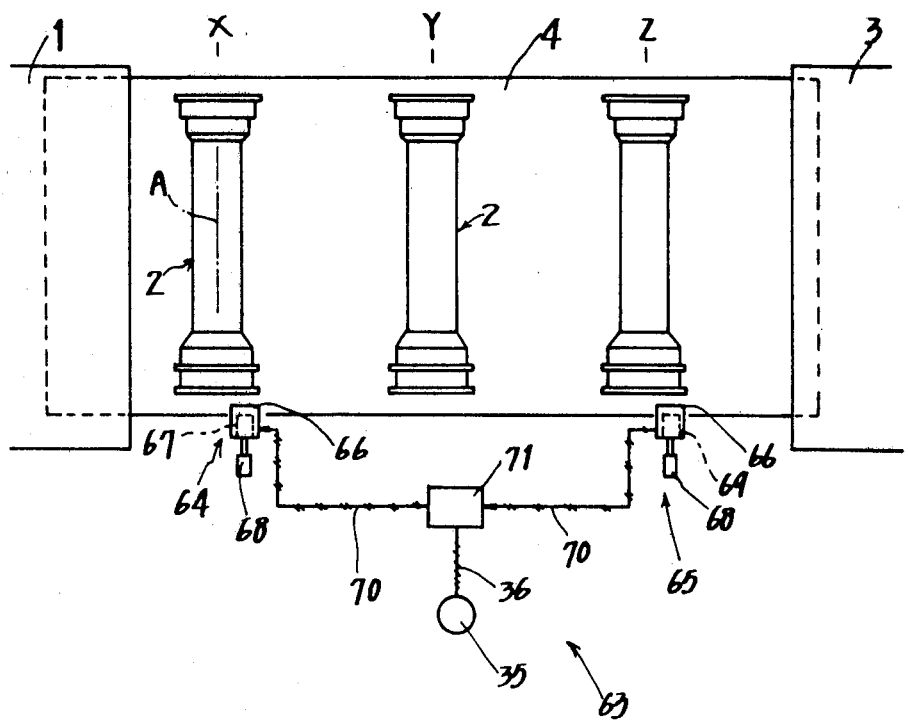
FIG. 1 is an explanatory view of the flow of a rotary mold.

Referring to FIG. 1, a rotary mold 2, delivered from a rotary-mold delivery chute onto an intermittent feed means 4, is rotated at starting position X and delivered to molding position Y while being kept in rotation. At this position Y a composite material pipe is molded by using such means and materials as will be hereinafter described, and upon completion of a cycle of molding operation the rotary mold, as it holds the molded item in it, is delivered to damping position Z, where the rotary mold is caused to stop rotating and loaded onto a rotary mold discharge chute 3.

Figure 2:
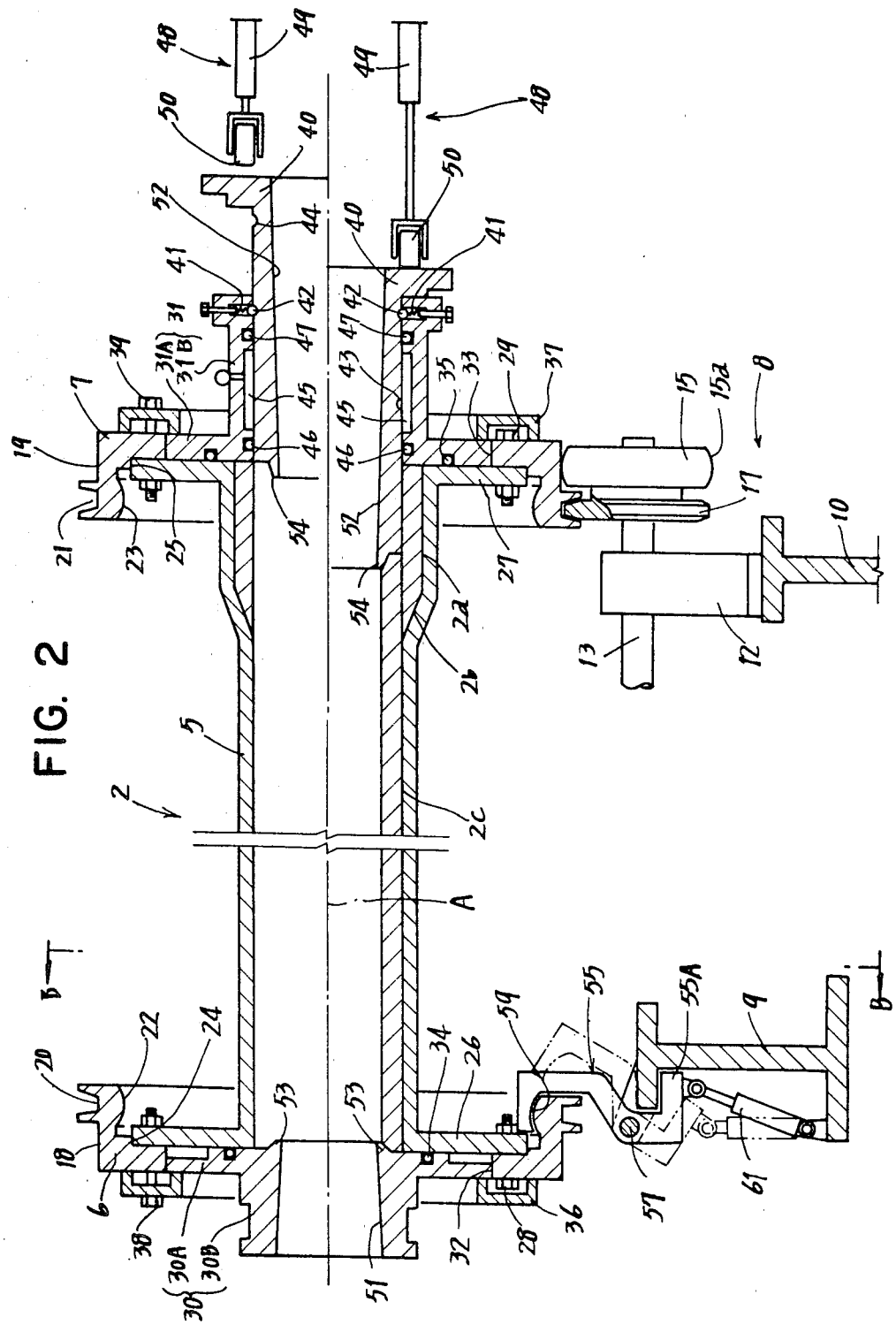
FIG. 2 is a longitudinal section of the rotary mold.
Figure 3:
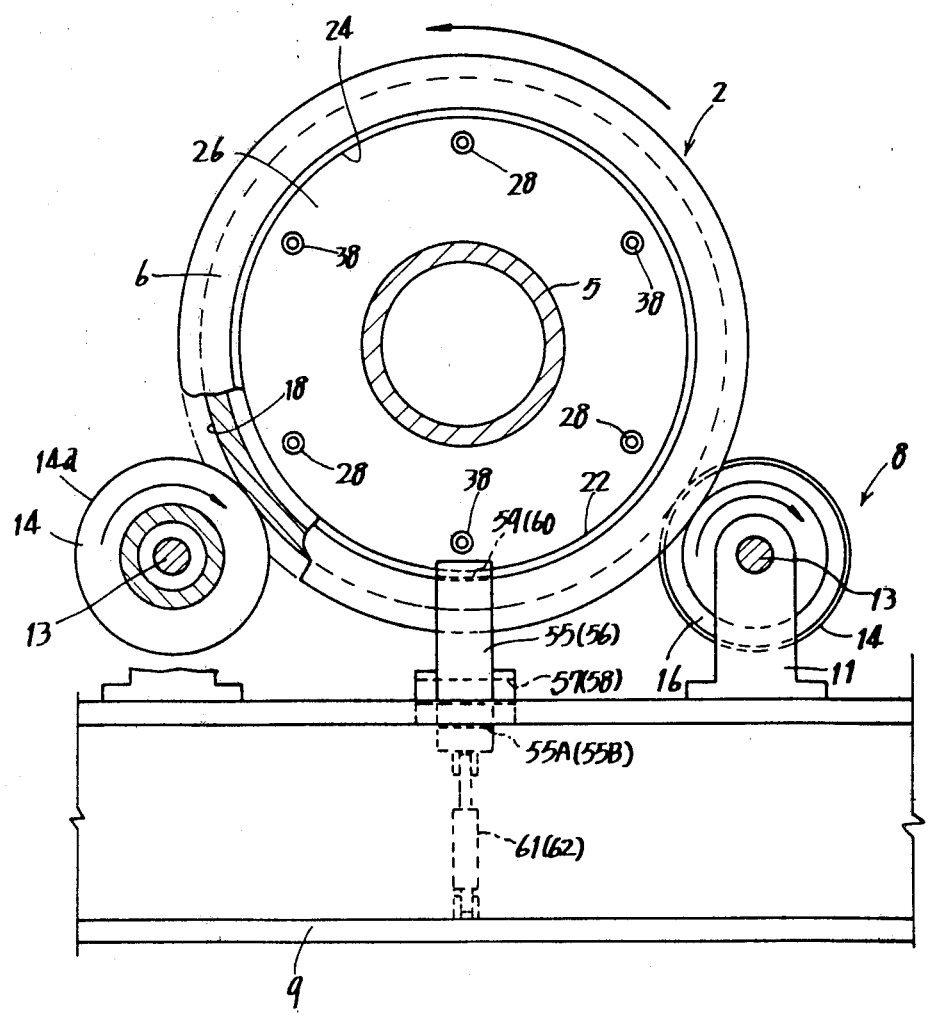
FIG. 3 is a sectional view in perspective taken along line B—B in FIG. 2.
Figure 4:
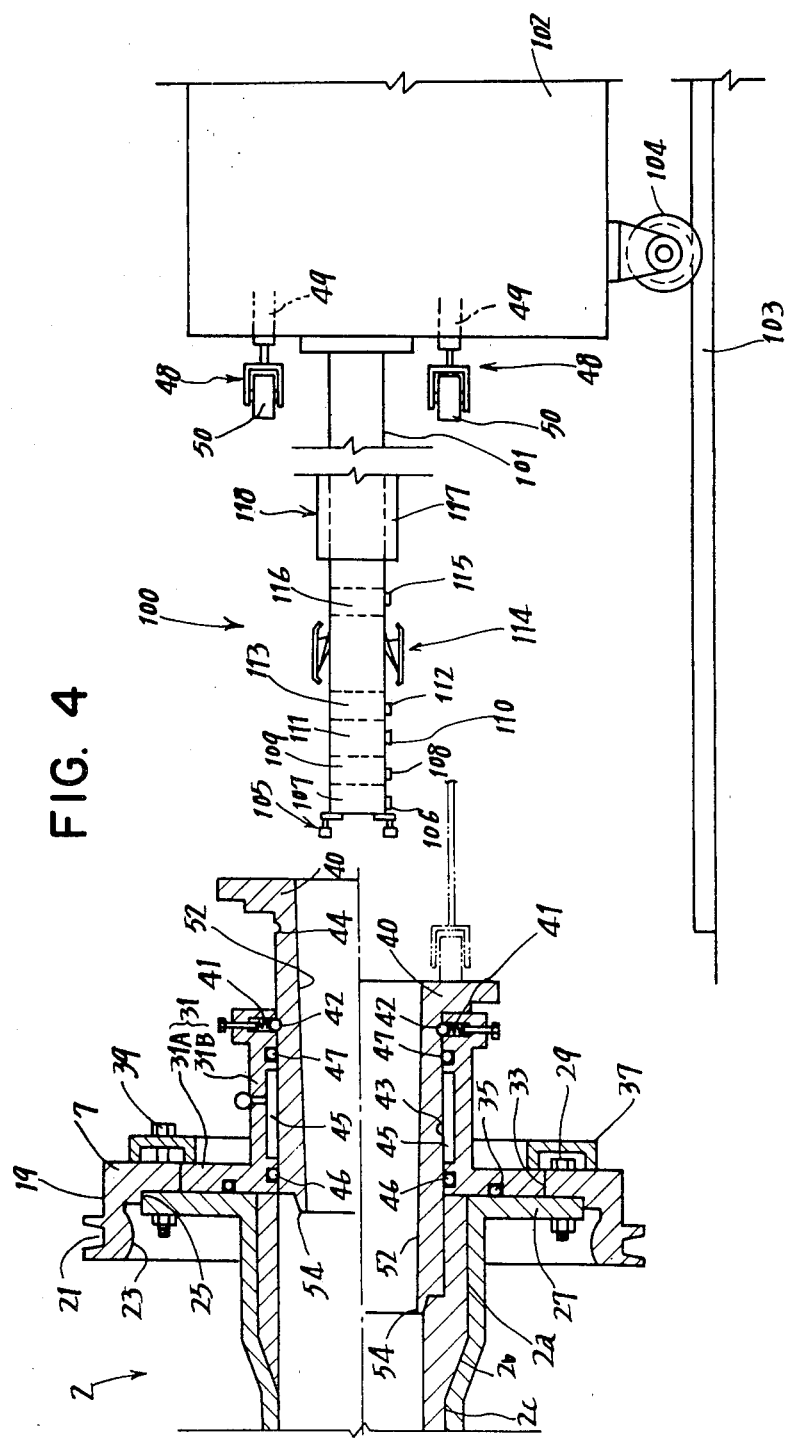
FIG. 4 is a side elevation of operating arm means, the subject matter of the invention.

As shown in FIG. 2 (wherein one-half portion above the axis of rotation A illustrates the rotary mold 2 seen as a faucet is formed therein and the other half portion shown below the axis illustrates the mold 2 seen as the entirety of a pipe is formed therein), the rotary mold 2 comprises a two-part divisible body 5 and annular members 6, 7 mounted to it at both ends thereof, being mounted on rotation drive means 8. Said rotation drive means include a rotating shaft 13 supported through bearings 11, 12 by a pair of support frames 9, 10 mounted to said intermittent feed means, rollers 14, 15 mounted on the rotating shaft 13 at both ends thereof, wheels 16, 17 integrally attached to the rollers 14, 15 on the inner side thereof, and a drive source (not shown) interlocking with the rotating shaft 13, said rollers 14, 15 having arched surfaces 14a, 14b on their respective peripheries. Said annular members 6, 7, on their respective outer-side peripheries relative to the axis of rotation of the rotary mold 2, have rolling contact surfaces 18, 19 to be engaged by the rollers 14, 15, and on their respective inner-side peripheries relative to said axis of rotation, they have circumferential grooves 20, 21 to be engaged by the wheels 16, 17. Further, there are formed convex surfaces 22, 23 on the inner peripheries of the annular members 6, 7 relative to said circumferential grooves 20, 21. The annular members 6, 7 also have annular recessed portions 24, 25 respectively on their inwardly opposed surfaces.

At both ends of its body the rotary mold 2 has outwardly protruding flange members 26, 27 integrally formed therewith. The flange members 26, 27 are closely fittable in said annular recessed portions 24, 25, and by fitting the former into the latter and clamping them together by clamping elements 28, 29 at three circumferential points, the annular members 6, 7 and flange members 26, 27 are integrally united.

Reference numerals 30, 31 designate end jigs which can be axially inwardly secured to said flange portions 26, 27 in abutment relation therewith. The end jigs 30, 31 include collar portions 30A, 31A adapted to closely fit in the innermost peripheries 32, 33 of said annular members 6, 7 and to axially inwardly abut said flange portions 26, 27 through seal rings 34, 35, and tube portions 30B, 31B provided outwardly from the collar portions 30A, 31A and in integral relation therewith. The end jigs 30, 31 are secured in position by putting ring-shaped press fitting members 36, 37 axially inwardly over the annular members 6, 7 and collar portions 30A, 30B and clamping into integral unity the press fitting members 36, 37, annular members 6, 7 and flange portions 26, 27 together at three circumferential points.

Shown at 40 is a tubular faucet-interior molding means which is housed in the end jig 31 and movable substantially along the axis of rotation (A) of the rotary mold 2. The faucet-interior molding means 40 is adapted to cover the internal periphery of a pipe faucet being molded when it is caused to protrude inwardly along the axis of rotation (A) relative to the end jig 31. In the end jig 31, on the inner peripheral side thereof, there is provided a ball 42 which is urged radially inwardly by means of a spring 41, and on the outer periphery of the faucet interior molding means 40, at two locations spaced apart along the axis of rotation (A), there are provided recesses 43, 44 engageable with the ball 42. The recesses 43, 44 are so located that the ball 42 engages the recess 43 when the axially inward end of the faucet-interior molding means 40 is aligned with the axially inward end of the end jig 31, and the ball 42 engages the recess 44 when the faucet-interior molding means cover the inner periphery of the pipe faucet. The end jig 31 has a release agent chamber 45 defined by its inner periphery. In the end jig 31 there are also provided seals 46, 47 on both sides of the chamber 45, axially spaced apart.

There is provided a push means 48 adapted to closely contact the axially outer end of the faucet-interior molding means 40. The push means 48 has a cylinder 49 and a floating roller 50 mounted to the piston rod of the cylinder 49 and adapted to closely contact the outer end of said molding means 40. The inner periphery 51 of the end jig 30 and the inner periphery 52 of the faucet-interior molding means 40, both are tapered so that the inner diameter becomes larger toward the axially outer end. The end jigs 30, 31, on their respective axially inner ends, have axially inwardly extending annular protrusions 53, 54.

Shown at 55, 56 are pivotable stoppers which are provided for controlling the rotary mold 2 in rotation against slipping out of position. The stoppers 55, 56 are secured at a middle point to said support frames 9, 10 through pins 57, 58. The upper ends of the stoppers 55, 56 are bent outwardly and the undersides of said upper ends are concaved to form concaved surfaces 59, 60 slidably engageable with said convex surfaces 22, 23. The lower ends of the stoppers 55, 56 are bent inwardly to serve as catch means 55A, 56A for the frames 9, 10. Between the catch means 55A, 56A and the frames 9, 10 there are provided cylinders 61, 62 which represent an example of pivotal control means for stoppers 55, 56.

Driving force for said rotating shaft 13, that is, for the rotary mold 2 is supplied by a drive source (not shown). Generally, starting rotation requires much more power than maintaining rotation, and when stopping rotation, much energy is wasted. In view of this fact, a damping force utilization unit 63 as shown in FIG. 1 may be provided. A clutch plate (not shown) is mounted to the rotating shaft 13 (FIG. 2), at one end thereof, and starting power supply means 64 and rotation power collecting means 65 are disposed, in opposed relation to the clutch plate, at starting position X and damping position Z respectively. The starting power supply means 64 comprise a motor 67 housed in a case 66, a clutch plate (not shown) mounted to the shaft of the motor 67 in opposed relation to the clutch at said rotating shaft 13, and a cylinder for retractably displacing the case 66. The rotation power collecting means 65 is of same construction as the starting power supply means 64 except that a generator 69 is provided in place of the motor 67. The generator 69 and motor 67 are connected to each other by wiring 70. In the wiring 70 there is provided a thyristor chopper controller 71 to which is connected wiring from a power source. By this arrangement it is possible to cover shortage of starting energy for rotation of the rotary mold 2.

The provision of damping force utilization unit 63 as such makes it possible to utilize the damping force at damping position Z as starting power for rotation of the rotary mold 2 at starting position X, and therefore, said drive source may only have to maintain rotation of the rotary mold 2, which fact will lead to energy saving. It goes without saying that a damping force utilization unit 63 is not always required.

Now, the operating arm means forming the subject matter of the invention will be explained with reference to FIGS. 4 to 17, inclusive. Operating arm means designated generally by numeral 100 has a tubular arm lever 101 which is supported at the base end thereof by a wheeled operating platform 102 and protrudable into and retractable from the rotary mold 2. The wheeled operating platform 102 is mounted on rails 103 through wheels 104. The arm lever 101 can be protrudably and retractably displaced along said axis of rotation A by moving the operating platform 102 toward and away from the rotary mold 2. The arm lever 101 is provided, in sequence from its front end, with a press roll portion 105 expansible and contractable relative to the inner periphery of the pipe being molded, a first resin-liquid supply portion 107 having a first nozzle 106, a second resin-liquid supply portion 109 having a second nozzle 108, a chopped-strand supply portion 111 having a feed opening 110, a third resin-liquid supply portion 113 having a third nozzle 112, a sand smoothing portion 114 expansible and contractable relative to the inner periphery of the pipe being molded, a sand supply portion 116 having a discharge opening 115, and a roving supply portion 118 having a suitable quantity of roving 117 wound on the outer periphery of a part of the arm lever 101.

Figure 5:
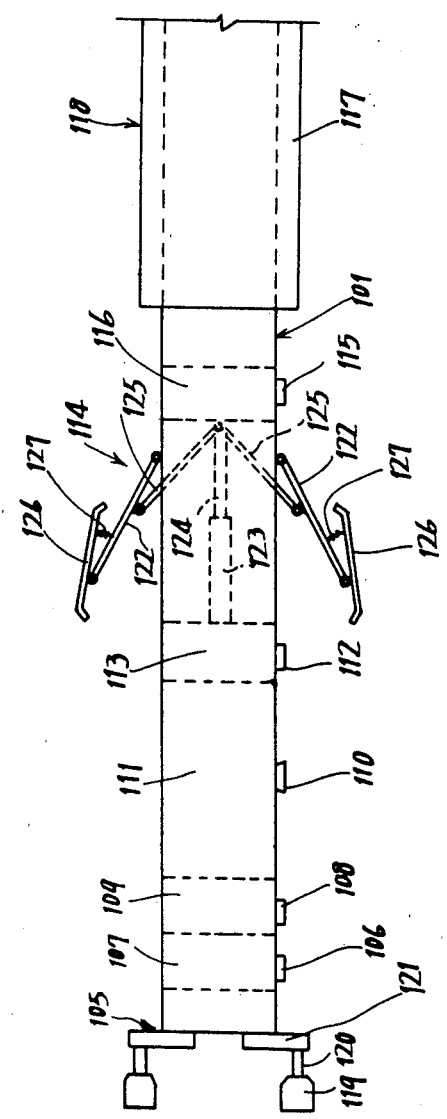
FIG. 5 is an enlarged side view of said operating arm means.

As can be seen from FIG. 5, the press roll portion 105 is provided with a plurality (two in the emodiment shown) of press rolls 119 displaceable toward and away from mold areas 2a, 2c in the rotary mold 2. Press roll shafts 120 are individually mounted to displacement mechanisms 121, the displacement of which causes the press rolls 119 to protrude and retract accordingly.

The sand smoothing portion 114 includes plate spring levers 122 mounted at one end thereof to the arm lever 101 at a plurality of peripheral locations thereon, a cylinder 123 for pivotally displacing the plate spring levers 122, links 125 connecting a piston rod 124 of the cylinder 123 to the plate spring levers 122 so as to convert the reciprocal movement of the piston rod 124 into the pivotal displacement of the plate spring levers 122, sand smoothing plates 126, each pivotally movably attached to the free end of one of the plate spring levers 122, and tension springs 127 provided between the sand smoothing plates 126 and the plate spring levers 122, the sand smoothing surface of each of said sand smoothing plates 126 being arched.

Material supply to said portions 107, 109, 111, 113, and 116 and control of said portions 105, 114 and 118 are channeled through the interior of the arm lever 101. The wheeled operating platform 102 is loaded with various units such as material tanks.

Figure 6:
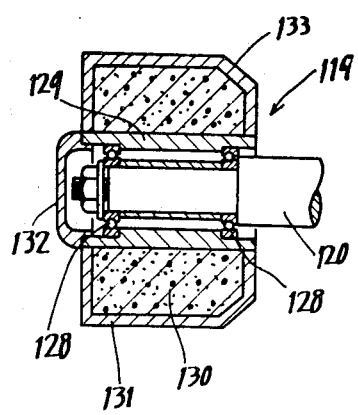
FIG. 6 is a side view in vertical section of a press roll.
Figure 7:
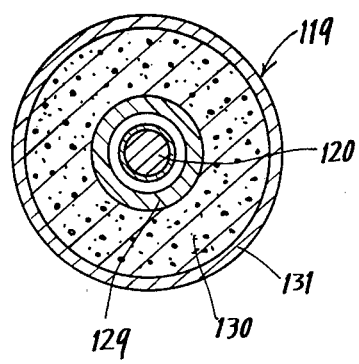
FIG. 7 is a front view in vertical section of said press roll.
Figure 8:
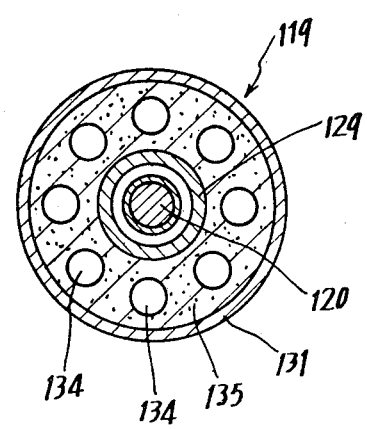
FIGS. 8 and 9 are front views in vertical section showing modified forms of press roll.
Figure 9:
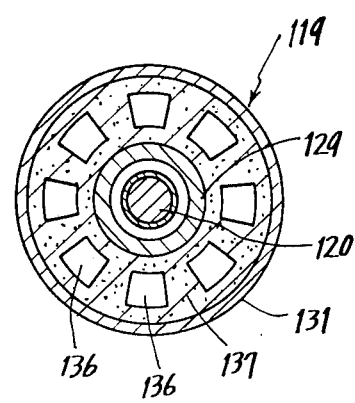

As illustrated in FIGS. 6 and 7, said press roll 119 comprises a ring member 129 floatably mounted to the front end portion of said press roll shaft 120 through a bearing 128, a foamed material member 130 (a resilient member shown by way of example) composed of foamed rubber layers laminated over the ring member 129, a flexible member 131 covering the foamed material member 130 and composed of such materials as Biton, silicone, and urethane, and a cover 132 attached to the ring member 129 to cover the front end of a rotating shaft 120, the outer peripheral edge of the press roll 119, on the arm lever (101) side, being tapered to form a tapered surface 133. Among other examples of resilient member suitable for use are a rubber member 135 having circular hollows 134 as shown in FIG. 8 and a rubber member 137 having angular hollows 136 as shown in FIG. 9.

The press roll 119 of the above construction has the advantage that defoaming can be accomplished as desired by pressing or biassing the flexible member 131 against the inner periphery of the pipe being molded. Any irregularity present on the peripheral surface of the pipe can be absorbed through the deformation of the foamed material member 130 so that occurrence of vibration can be prevented. Moreover, resin splashes, if any, caused during the biassing operation can be minimized because of the tapered surface 133, being thus prevented from affecting the bearing 128 and/or its adjacent area.

Figure 10:
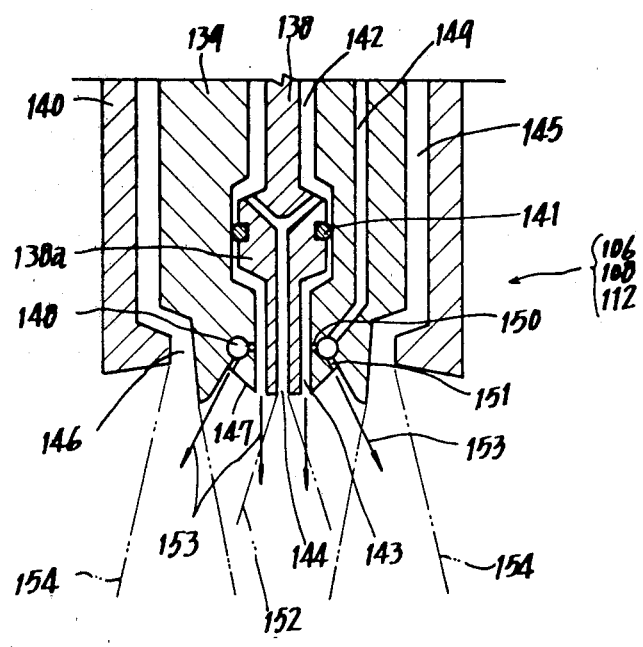
FIG. 10 is a vertical section of a resin-liquid feed nozzle.

Two different kinds of resin-liquids (for example, catalyst-mixed resin liquid and curing-accelerator-mixed resin liquid) are usually supplied by each of the three nozzles 106, 108, 112 provided in said three resin-liquid supply portions 107, 109, 113, which fact permits the suitable selection of the two kinds of resin liquids to increase or decrease the curing rate of resin. Each of the nozzles is of such construction as illustrated in FIG. 10. It comprises a core 138, an inner tube portion 139 arranged around the core 138 and an outer tube portion 140 arranged around the inner tube portion 139, said core 138, inner tube 139 and outer tube 140 being laid concentrically, one over another, with annular space defined in between. The core 138 has a larger-diameter portion 138a adjacent its lower end. On the outer surface of the larger-diameter portion 138a there is set a seal ring 141, the opening portion above the seal ring 141 being a passage 142 for one of said two kinds of resin liquids and the opening portion below the seal ring 141 being an air passage having an inner air jet opening 143. Centrally in the core 138 there is provided a jet opening 144 for said one of the two kinds of resin liquids, the upper end of which communicates with the passage 142. The space between the inner tube portion 139 and the outer tube portion 140 serves as a passage 145 for the other of said two kinds of resin liquids, its lower end serving as a jet opening 146 for said another kind of resin liquid. On the lower end of said inner tube portion 139 there is provided an annular groove 147 having an inverted V profile. An annular air locker 148 is provided adjacent the lower end of the inner tube portion 139. An air supply passage 149 formed in the inner tube portion 139 in the longitudinal direction thereof communicates, at its lower end, with said air locker 148, which in turn communicates with the air jet opening 143 through a communication passage 150. An outer air-jet-opening 151 communicating with said air locker 148 is open in said groove 147 and toward a space below said jet opening 146.

According to above described arrangement, resin liquid 152 of said one kind jetting through the jet opening 144 is dispersed by high-pressure air 153 jetting through the inner air-jet-opening 143, and resin liquid 154 of said another kind jetting through the jet opening 146 is dispersed by air 153 jetting through the outer air-jet-opening 151. The resin liquids 152, 154 thus dispersed are mixed together in the molding area below and the resulting mixture proceeds to cure. When the jetting of resin liquids 152, 154 is stopped, air curtains formed by high-pressure air jet from the air jet openings 143, 151, coupled with the presence of said groove 147, prevents the trouble that droplets of resin liquids 152, 154 flow along the lower end of the nozzle to join and the so joined droplets become hardened to clog the resin-liquid jet openings 144, 146.

In the arm lever 101 there is provided a sand feeding conveyer means 155 the front end of which fronts toward the sand supply portion 116. As FIGS. 11 and 12 illustrate, the sand feeding conveyer means 155 comprises a tubular enclosure 156 having, at base end thereof, a receiving port 157, and screw means mounted in the tubular enclosure. A hopper 159 is provided above the receiving port 157. The screw means 158 comprises a hollow screw shaft 162 rotatably supported by bearings 160, 161 and a screw vane 163 mounted over the outer periphery of the screw shaft 162. The interior of the screw shaft 162 serves as a air passage 164, which is open into the tubular enclosure 156 through a multiplicity of air holes 165 provided over the hollow screw shaft 162 along the length thereof. The base end portion of the hollow screw shaft 162 protrudes out of the tubular enclosure 156, and at said base end there is provided a rotary joint 166 through which said air passage 164 communicates with an air supply hose 167. Designated by reference numerals 168 and 169 are an air supply unit and a flow-rate regulator valve. The base end portion of the hollow screw shaft 162, also interlockingly communicates with rotation drive means 171 through a wrapping connector 170. Said screw vane 163 is so designed as to have a smaller pitch $P_1$ on the front end side than the pitch $P_2$ on the base end side. To provide such variation of pitch, the embodiment shown employs a double-vane type for the front-side portion of the screw vane. Alternatively, the vane screw may be of a single-vane type which is shorter pitched on the front-side portion. In the front-side portion of the tubular enclosure 156 there are provided a plurality of slits 173 partitioned by restrictor plates 172 and communicating with said discharge opening 115. The slits 173 are narrow in the axial direction, but substantially wide in the peripheral direction. On both sides of the slits 173 there are provided air nozzles 174, 175 which are so inclined that their openings are positioned in opposed relation. The air nozzles 174, 175 communicate, respectively through air feed hoses 176, 177, with a changeover valve 178, which in turn communicates with an air supply unit 168.

In sand-feeding conveyer means of such construction as above described, sand in the hopper 159 drops through the receiving opening 157 into the tubular enclosure 156 and is conveyed by means of the revolving screw 158 until it is discharged from the discharge opening through slits 173. In the course of transport, the pulsation of the sand is reduced by air jetting through the air jet openings 165 and, in the latter part of the path of sand travel, it is further reduced by the sand being transported to a smaller pitch $P_1$. Therefore, the sand may be discharged through slits 173 without pulsation and fed on to the molding area in the rotary mold 2. During the discharge operation, the flow of direction of the sand is regulated by the restrictor plates 172.

Figure 13:
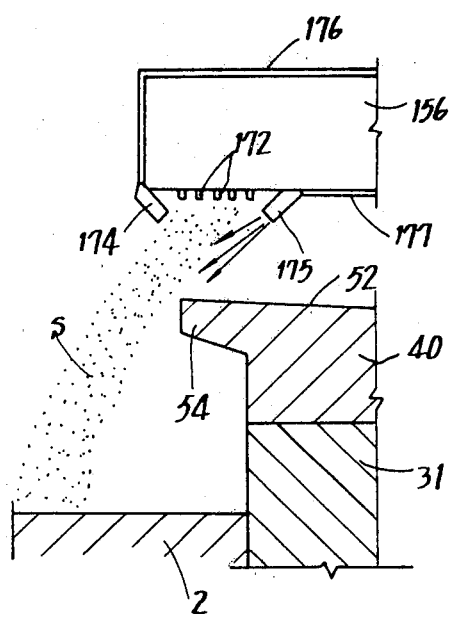
FIGS. 13 and 14 are schematic views showing the operation of said sand feeding conveyer means.
Figure 14:
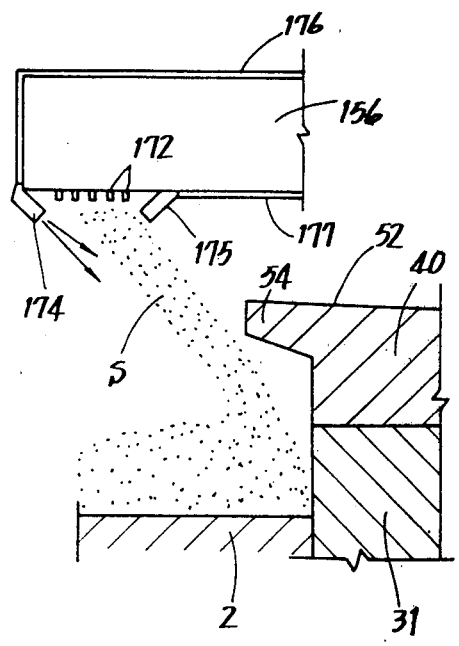

In such sand feeding operation, if sand S is supplied when the slits 173 are opposed to the annular protrusion 54, as shown in FIG. 13, sand S may be merely allowed to go along the tapered surface 52 to fall outside the molding area. According to the above described arrangement, air is jetted out through the air nozzle 175 to allow sand S to get over the annular protrusion 54 satisfactorily. And when the slits 173 are positioned inwardly of the annular protrusions 54, air is jetted out through the other nozzle 174 to rightly orient sand S for distribution to an area below the annular protrusion 54. During movement in or to a more inward area, the change-over valve 172 is locked and air jetting from air nozzles 174, 175 is suspended. Sand feeding to an area adjacent the other annular protrusion 53 is carried out in same manner.

Thus, said sand-feeding conveyer means 155 makes it possible to supply sand uniformly on to the pipe molding area and thereby to avoid insufficient sand distribution to areas below the annular protrusions 53, 54. This means production of crack-free pipes.

Figure 15:
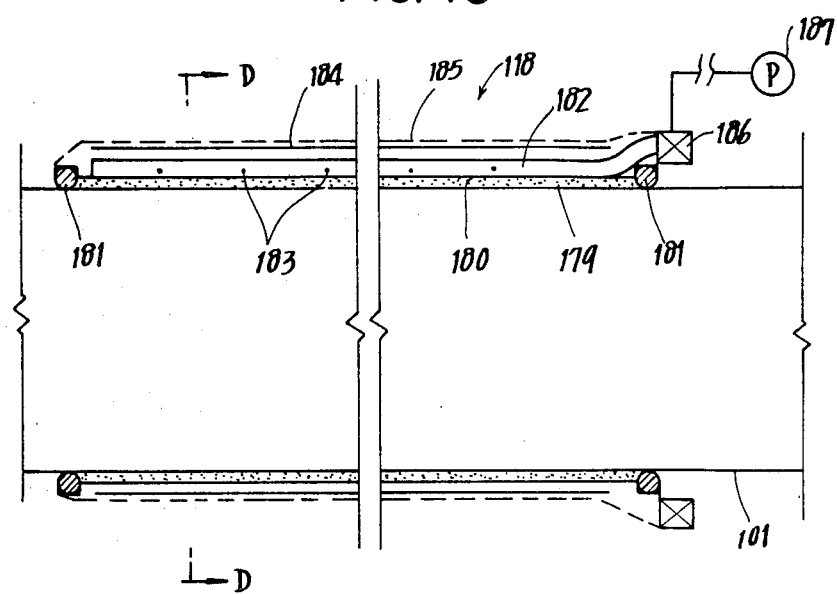
FIG. 15 is a longitudinal section of a roving supply portion.
Figure 16:
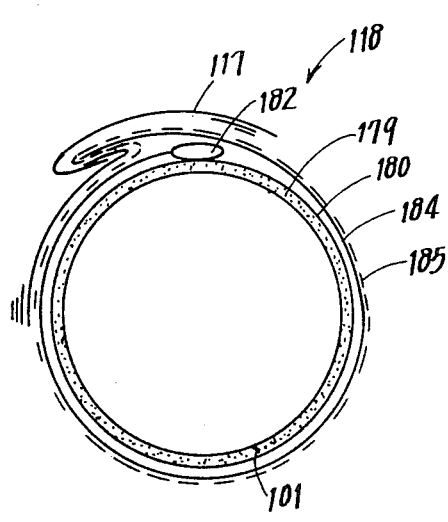
FIGS. 16 and 17 are sectional views taken along line D—D in FIG. 15, with roving shown in FIG. 16 as it is wound up and retained in position and in FIG. 17 as it is released from retention and going to be paid out.
Figure 17:
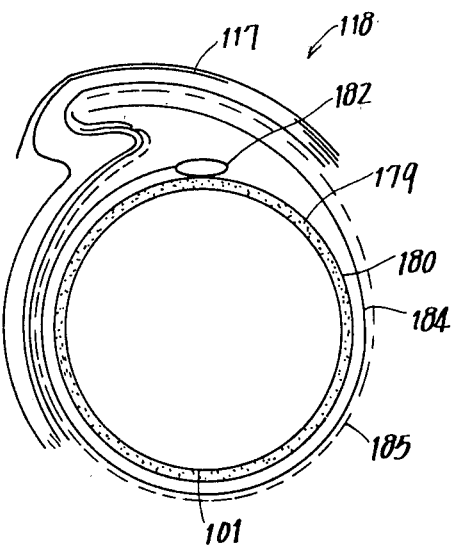

As can seen from FIGS. 15, 16 and 17, the roving supply portion is of the following construction. A cylindrical plate 180 is rotatably fitted over the arm lever 101 through fluid 179, with annular seal rings 181 mounted at both ends of the cylindrical plate 180 between said plate 180 and the arm lever 101. On said cylindrical plate 180 there is securely mounted a tube 182 extending in the lengthwise direction of the arm lever 101 and having a plurality of air jet openings 183. Further, a resilient plate 184 is loosely wrapped around the cylindrical plate 180 substantially one round, said plate 184 being secured, at one end thereof, to the tube 182. And a rubber sheet 185 covers the surface of the resilient plate 184 to form an enclosed space on said cylindrical plate 180. Roving 117 is retained in position as it is wound on said rubber sheet 185. It is released from retention by feeding air by a pump 187 into the tube 182 through a rotary joint 186 and is led out on to the molding area.

To explain more concretely, when air in said enclosed space is removed by means of the pump 187, the free end portion of the resilient plate 184 and its fixed end portion get closer to each other as can be seen from FIG. 16, and the end of the roving (winding cloth) 117 is held between said free end portion and said fixed end portion. Conversely, when air is introduced by pump 187 into the enclosed space, the free end of the resilient plate 184 and its fixed end go further away from each other and the end of the roving 117 which has been held between said free end portion and said fixed end portion is released from the state of being held, being thus transferred on to the pipe molding area.

Next, the operation of the above described operating arm means 100 and rotary mold 2 employed in molding a composite material pipe having a faucet portion will be explained by way of example with reference to FIGS. 18 to 28, inclusive.

Figure 18:
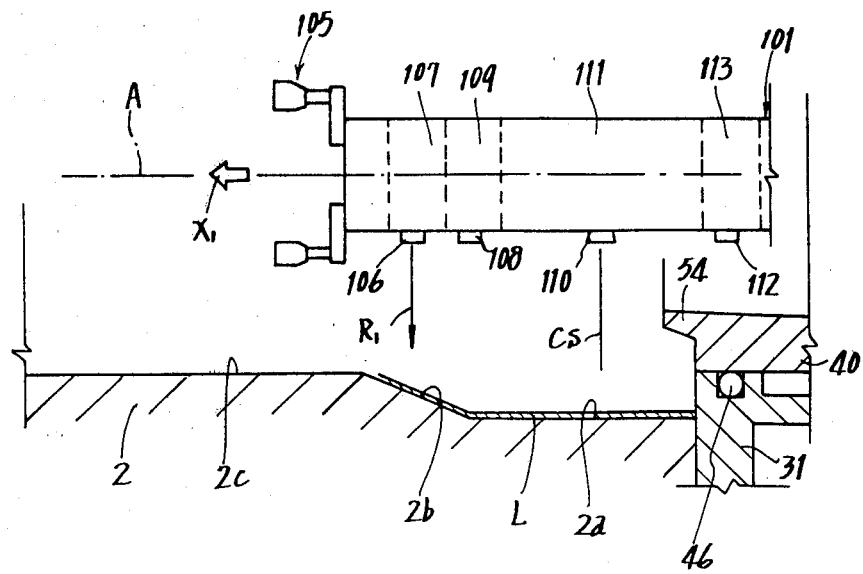
Figure 19:
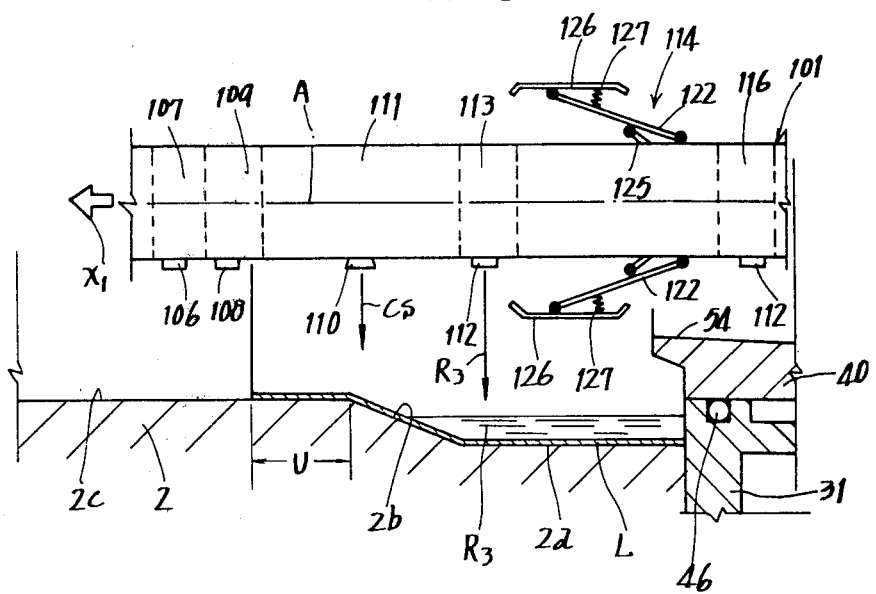
Figure 20:
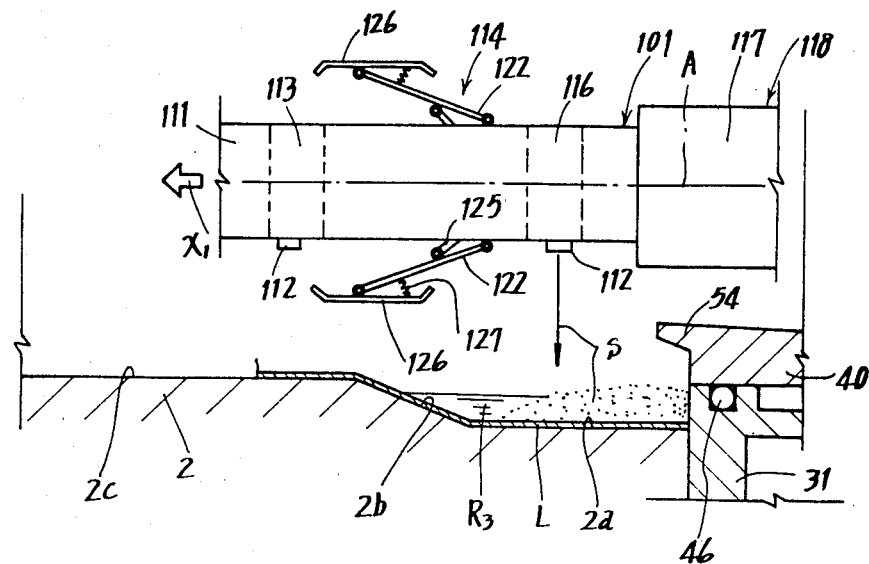
Figure 21:
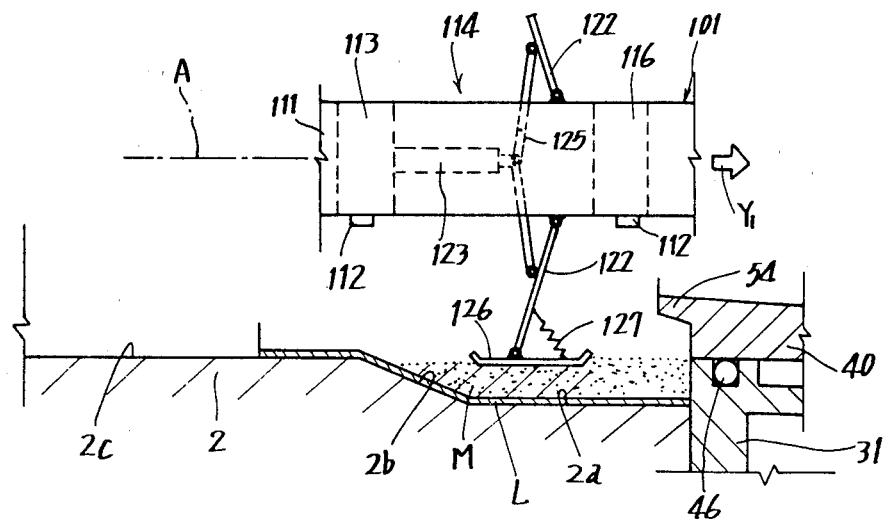
Figure 22:
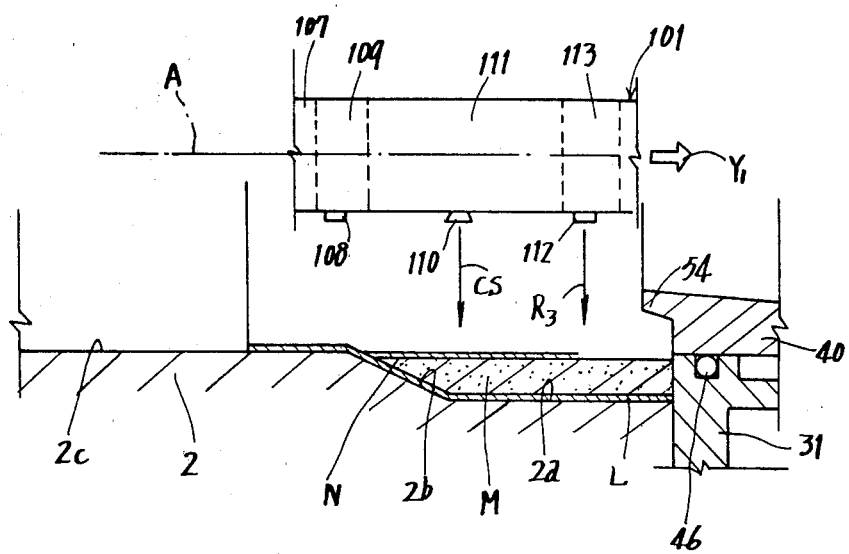
Figure 23:
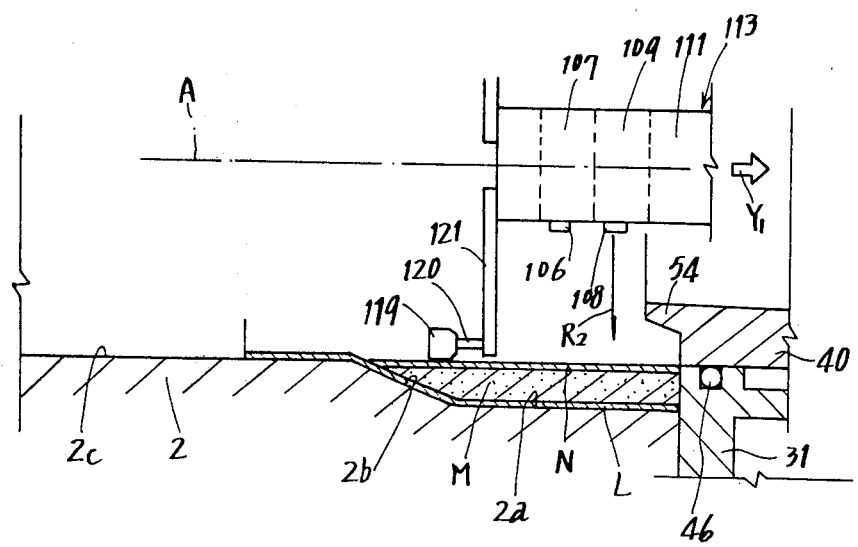

The arm lever 101 is inserted through the through-hole of the faucet interior molding means 40 for movement $X_1$ in the rotary mold 2 while the rotary mold 2 being rotated. As shown in FIG. 18, a first resin liquid (a mixture of the two kinds of resin liquids referred to hereinbefore) is supplied through the first nozzle 106 over a faucet molding area 2a, a stepped portion molding area 2b, and a part of a body molding area 2c and then chopped strand CS is supplied through the feed opening 110 over the same areas while the rotary mold 2 is kept in movement relative to the arm lever 101, whereby a faucet reinforcing outer resin layer L is molded over said areas. In the course of subsequent movement $X_1$ of the arm lever 1 in the rotary mold 2, a third resin liquid $R_3$ is supplied through the third nozzle 112 over the faucet reinforcing outer resin layer L corresponding to the faucet molding area 2a and stepped portion molding area 2b, as can be seen from FIG. 19. During this feeding operation, said reinforcing outer resin layer L for the faucet portion is molded over an area extending up to a part of body molding area 2c. In this connection, the distance U of said part of body molding area 2c is not less than 100 mm. During further subsequent movement $X_1$ of the arm lever 1, sand S is supplied through the discharge opening 112 onto the third resin liquid $R_3$ supplied, as shown in FIG. 20. In the course of this sand supply operation, grains of sand may scatter to the body molding area 2c, but such scattered grains of sand are perfectly caught within the faucet reinforcing outer resin layer L allowing for distance U. Then, as FIG. 21 shows, sand smoothing operation is carried out by the sand smoothing portion 114 as the arm lever 101 is given retracting movement $Y_1$. Sand smoothing is done as the sand smoothing plate 126 is displaced outwardly by contraction of the cylinder 123 through the links 125 and plate springs 122, whereby a sand-incorporated resin layer M is formed for the faucet portion. Further, during the retracting movement $Y_1$, third resin liquid $R_3$ is supplied through the third nozzle 112 on to said sand-incorporated resin layer M and then chopped strand CS is supplied through the feed opening 110, whereby a reinforcing inner resin layer N for the faucet portion is formed on said layer M, as illustrated in FIG. 22. Immediately after that, as FIG. 23 shows, the press roll 119, protracted downwardly, is caused to press said reinforcing inner resin layer N for pressing-in of the chopped strand CS and deaeration. The state of molding as achieved in the operation thus far explained is presented in the portion shown above the axis of rotation A in FIG. 2.

Figure 24:
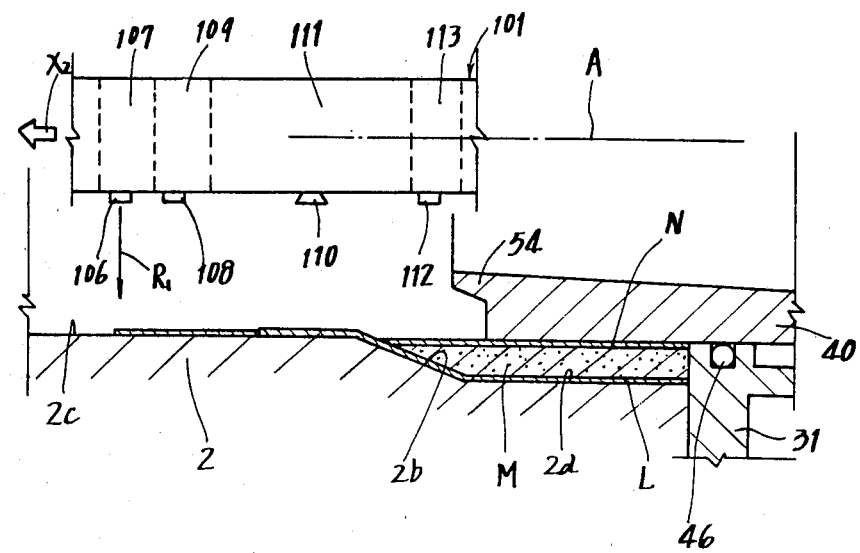
Figure 25:
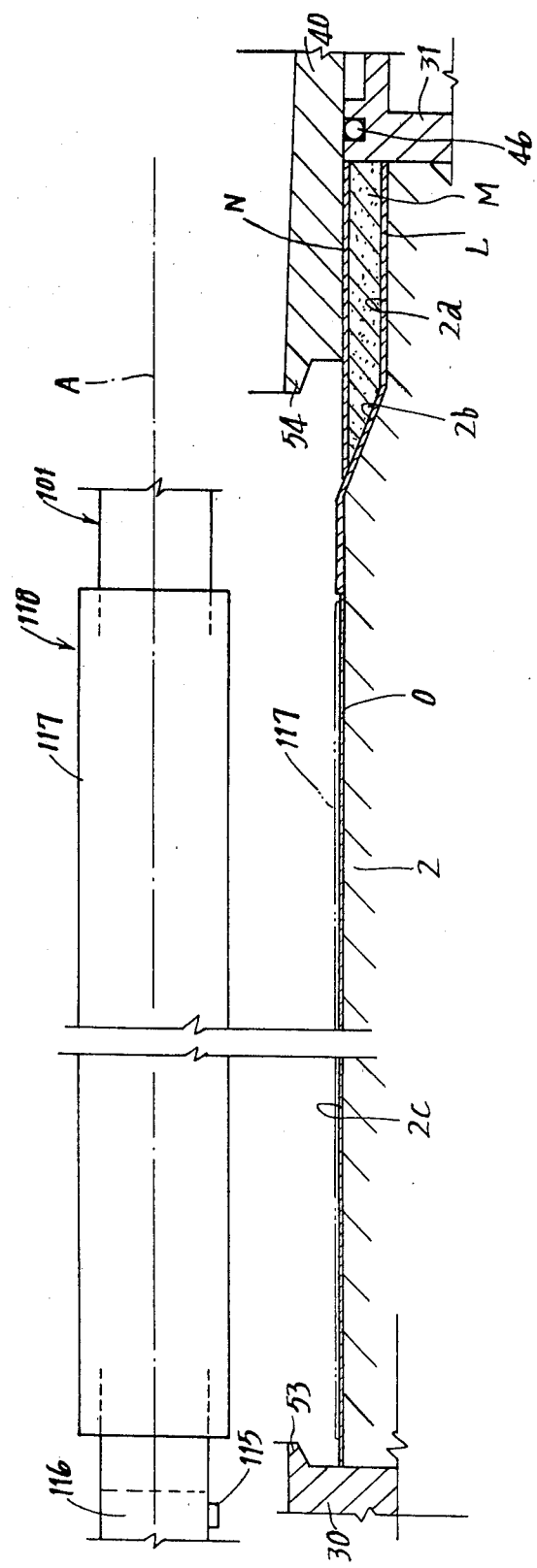
Figure 27:
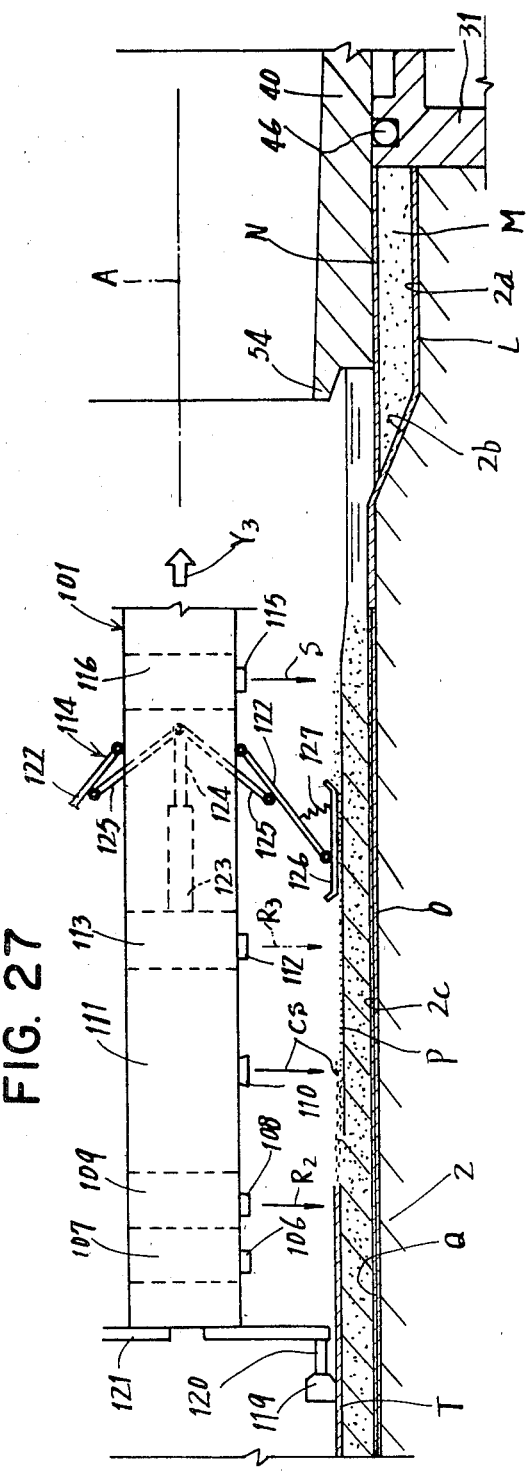
Figure 28:
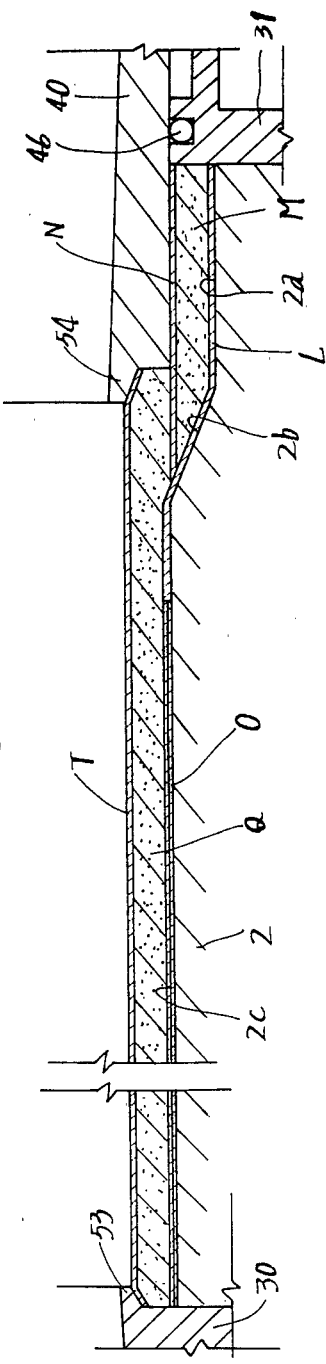

Nextly, the push means 48 is actuated to push in the faucet interior molding means 40 over a predetermined distance through the floating roller 50. Upon this push the ball 42 engages the recess 44 and the faucet interior molding means 40 is held in position. Then, as FIG. 24 shows, the arm lever 101 is again introduced into the rotary mold 2 for movement $X_2$ therein, and in the course of this movement, first resin liquid $R_1$ is supplied through the first nozzle 106 on to the body molding area 2c in succession to the faucet reinforcing outer resin layer L. And when the arm lever 101 has advanced to a point where the roving supply portion 118 is opposed to the body molding area 2c, the movement of the arm lever 101 is stopped and roving 117 wound on the arm lever 101, as shown by full line in FIG. 25, is transferred on to the body molding area 2c as indicated by imaginary line in FIG. 24, whereby a body reinforcing outer resin layer O is molded on the body molding area 2c. Chopped strand CS may be supplied in place of roving 117.

Figure 26:
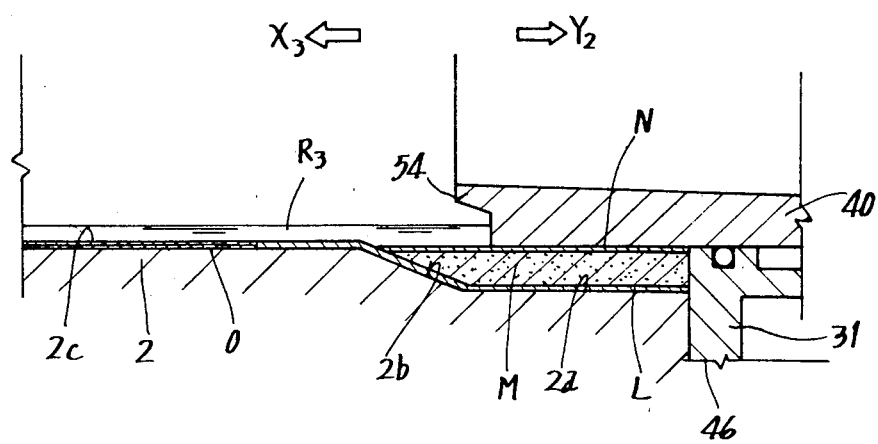

Then, as FIG. 26 illustrates, the arm lever 101 is retracted ($Y_2$) from the rotary mold 2, and upon subsequent insertion of the arm lever 101 into it for movement therein ($X_3$), third resin liquid $R_3$ is supplied through the third nozzle 112 on to the body reinforcing outer resin layer O. And again the arm lever 101 is caused to retract, and in the course of this retracting movement $Y_3$, sand S is supplied through the discharge opening 115 into the third resin liquid $R_3$ already supplied. For this purpose, the supply of sand S relative to the third resin liquid $R_3$ supplied is controlled so that a sand-incorporated resin layer Q for the body portion is formed with a sand layer P partially retained or the top. The thickness of the sand layer is preferably not more than 5 mm, for example. Said figure of 5 mm substantially corresponds to the depth of impregnation by resin liquid to be supplied next. During the subsequent retracting movement $Y_3$, smoothing of said layer P is performed by the sand smoothing plate 126, chopped strand CS is supplied through the feed opening 110 onto the sand layer P, and second resin liquid $R_2$ is supplied through the second nozzle 108 onto the chopped strand CS supplied. In this connection, the amount of second resin liquid $R_2$ supplied is calculated so that the resin is impregnated into said sand layer P as well. Thus, a body reinforcing inner resin layer T is molded over the body sand-incorporated resin layer Q. Immediately thereafter, the press roll 119 is protracted and caused to press the body reinforcing inner resin layer T for press-in of the chopped strand CS and deaeration. During this operation, third resin liquid $R_3$ may be supplied through the third nozzle 112 over the smoothed sand layer S, as shown by imaginary line in FIG. 27. In the course of above described sand supply operation, part of the sand may drop into the spigot-side end jig 30 and/or the faucet interior molding means 40, but such sand is automatically discharged along the outwardly descending tapered surfaces 51, 52.

Integral molding can be done as above described. In FIG. 2, the portion presented below the axis of rotation A shows a completed state of integral molding. As shown, annular protrusions 53, 54 are in abutment with the spigot-side inner peripheral edge and the faucet stepped portion's inner peripheral edge respectively, and accordingly, there is no burr possibility with pipes thus produced.

To remove the molded product, the rotary mold 2 is caused to stop rotation. The faucet interior molding means 40 is moved outwardly, then locking members 38, 39 are released to remove the press fittings 36, 37 (see FIG. 2). The faucet-side end jig 31 and faucet interior molding means 40 are drawn out together from the rotary mold 2. The spigot-side end jig is also removed from the mold. Then, the product is extracted from the mold body 5. The body 5 is separable into two parts. Therefore, after the annular members 6, 7 are dismantled, the molded item can easily be removed by dividing the mold into two separable parts.

The above said first resin liquid is designed to cure faster than the second and third resin liquids $R_2$, $R_3$. This permits easy removal of the product from the mold. Also, it is to be noted that while the above described example of molding operation, which includes faucet molding as well body molding, requires three-time reciprocation (insertion and withdrawal) of the operating arm means 100 relative to the rotary mold 2, the required number of times of such movement will be smaller if faucet molding is not involved. Even where faucet molding is involved, the frequency of such reciprocation may be decreased by changing the operating procedures.

Lastly, method of preparing a resin liquid-a curing-acceleration-mixed resin liquid by way of example-will be explained with reference to FIGS. 29 and 30. The numeral 188 represents a mixing tank having an agitating means 189. Acceleration-mixed resin liquid R from the tank 188 is supplied, through a pump 190, to either one of the resin liquid jet openings 144, 146. Shown at 159 is the earlier mentioned sand hopper, the sand S contained in which is fed to the rotary mold 2 by means of said sand feeding conveyer means 155. Designated as 191 is a piston-type fixed-amount resin liquid feeder whose upper chamber 192 and lower chamber 193 connects, through pipings 194 and 195 respectively, to a 4-port 2-position changeover valve 196, at one side. An actuator means 197 is mounted to the lower end of a piston rod projecting downwardly from the resin liquid feeder 191. At 198 there is shown a resin liquid tank, usually installed outdoor, and resin liquid 199 contained therein is supplied to the other side of said changeover valve 196 through a first resin-liquid supply pipe 203 having a pump 200, a flexible hose 201, and a regulator valve 202. A second resin-liquid supply pipe 204 connecting to the other side of the changeover valve 196 is open in said mixing tank 188. In the mixing tank 188 there is provided a float 205 detecting the storage level of accelerator-mixed resin liquid R. There is also provided therein an air limit switch 207 which is acted on by an actuator element 206 which is integral with the float 205. In the second resin-liquid supply pipe 204 there is provided an air valve 210 which is controlled through air pipe lines 208, 209 from the air limit switch 207. Further, a relief pipe line 211 is provided between the second resin liquid feed pipe 204 and the resin liquid tank.

The changeover valve 196 is actuated by an air cylinder 212 for changeover. Air from a controller 214 is introduced into its upper chamber 213 through a pipe line 215, and into its lower chamber 217 is introduced air from the controller 214 through a pipe line 218. Air from an upper limit air limit-switch 219 and air from a lower-limit air limit-switch 220—air to which the actuator 197 responds—are introduced into the controller 214 through pipe lines 221 and 222 respectively. Reference numeral 223 designates a piston pump having a piston rod 224 which, at its top end, is connected to an air cylinder 225. Into an upper chamber 226 of the air cylinder is introduced air from the controller 214 through an air pipe line 227; introduction into a lower chamber 228 of the air cylinder of air from the controller 214 is made through an air line 229. The piston rod 224 is, at its lower end, opposed to a servo cylinder 230 so that the stroke W of the piston pump 223 can be adjusted through the movement of the servo cylinder 230. The movement of the servo cylinder 230 is regulated by hydraulic pressure 232 from a stroke controller 231. Again, such regulation is controlled by detection signals from a temperature sensor 233 provided in the sand hopper 159, said signals relating to the temperature of sand S detected by the sensor 233. The arrangement is that when the temperature of sand S is relatively high, the servo cylinder 230 goes up and when the temperature is relatively low, the servo cylinder 230 goes down.

Designated as 235 is an accelerator tank containing accelerating agent 236, which tank connects to upper and lower chambers 239, 240 of the piston pump 223 through pipe lines 237, 238. Shown at 241 is a supply pipe line which is open into the mixing tank 108.

In FIG. 29, the piston of the fixed-amount resin liquid feeder 191 is at its upper limit and the lower chamber 193 is filled with resin liquid 199. The piston of the piston pump 223 is also at its upper limit and the lower chamber 240 is filled with accelerating agent 236. With conditions as such, if the pump 200 is actuated, resin liquid 199 is injected into the upper chamber 192 of the fixed-amount resin liquid feeder 191 after passing through the flexible hose 201, the first resin-liquid supply pipe 203, changeover valve 196, and pipe line 194. As a consequence, the lower chamber 193 is compressed, and accordingly, the resin liquid 199 wherein is supplied to the mixing tank 188 after passing through pipe line 195, changeover valve 196, and second resin-liquid supply pipe 204. Thereupon, the actuator 197 is lowered to release and actuate the upper-limit air limit switch 219, and accordingly, the upper chamber 226 of the air cylinder 225 is pressurized by the controller 214, and the piston of the piston pump 223 is lowered. Thus, the accelerating agent 236 in the accelerator tank 235 is sucked into the upper chamber 239 of the piston pump 223, and the accelerating agent in the lower chamber 240 is fed into the mixing tank 188 through pipe line 238 and supply pipe line 241.

The supply of accelerating agent 236 through the lowering of the piston rod 224 is stopped as the lower end of the piston rod 224 abuts the servo cylinder 230. Therefore, by having the temperature of sand S detected by the temperature sensor 233, entering the detection signals 234 into the controller 231, and applying to the servo cylinder 230 a suitable hydraulic pressure determined accordingly to cause the servo cylinder 230 to expand and contract, it is possible to supply an optimum amount of accelerator relative to the temperature of said sand S.

When the piston of the fixed-amount resin liquid feeder 191 is lowered and thereby the lower chamber 193 is almost completely contracted, the actuator 197 is caused to act upon the lower-limit air limit switch 220 so that the lower chamber 217 of the air cylinder 212 is pressurized through the air pipe line 222, controller 214 and pipe line 218. Thereupon, as FIG. 30 shows, the expansion of the air cylinder 212 causes the changeover valve 196 to switch over, whereby the resin liquid 199 in the resin liquid tank 198 is injected into the lower chamber 193 and simultaneously the resin liquid 199 in the upper chamber 192 is supplied into the mixing tank 188. Thus, resin liquid 199 is continuously fed into the mixing tank 188.

When the accelerator-mixed resin liquid R in the mixing tank 188 exceeds a certain level, the air limit switch 207 is actuated through the float 205, and the actuator element 206 and the air valve 210 is closed, whereupon the supply of resin liquid 199 is stopped. The resin liquid 199 being delivered in continuous flow is then caused to return to the resin liquid tank 198 through the relief pipe line 211.

When the actuator 197 ascends to release and actuate the lower-limit air limit switch 220, the lower chamber 228 of the air cylinder 225 is pressurized through the air pipe line 222, controller 214; and pipe line 229 and the piston of the piston pump 223 is caused to go up. As a result, the accelerating agent 236 in the accelerator tank 235 is sucked into the lower chamber 240 of the piston pump 223 through the pipe line 238, and the accelerating agent 236 in the upper chamber 239 is supplied into the mixing tank 188 through the pipe line 237 and the supply pipe line 241. Thus, accelerating agent 236 is supplied continuously as well, but this supply is subject to limitation by stroke W.

What is claimed is:

1. A centrifugal molding apparatus for manufacturing composite material pipes comprising a rotary mold and operating arm means protrusible and retractable relative to said rotary mold, said operating arm means having, in sequence from the front end thereof, a press roll member for pressing the interior of a pipe being molded, a first resin-liquid dispenser, a second resin-liquid dispenser, a chopped-strand feeder, a third resin-liquid dispenser, a sand smoothing means for smoothing sand supplied on to resin liquids, a sand supply means, and a roving supply means, said sand supply means including a screw conveyor having an inlet end and a discharge end, said discharge end having a discharge port in a peripheral housing of said conveyor, and plural air nozzles so positioned as to cooperate with said discharge port to distribute sand over the surface of said mold.

2. An apparatus as claimed in claim 1, wherein said sand smoothing means comprises at least one resilient rod mounted to a contractibly extensible mechanism and pivotally movable about its one end, a sand smoothing plate pivotally movable about the other end of said resilient rod and having a sand-smoothing arched surface, and a tension spring connecting said sand smoothing plate with said resilient rod.

3. An apparatus as claimed in claim 1, wherein said roving supply means comprises a cylindrical plate which rotatably fits over said operating arms means through a fluid bearing, a tube secured to said cylindrical plate and extending in the axial direction of said operating arm means and which has at least one air jet opening, a resilient plate secured at one end to said pipe and loosely wrapped around said cylindrical plate substantially one round, a rubber sheet covering said resilient member to form an enclosed space between it and said cylindrical plate, and air feed and discharge means connected to said tube through a rotary joint.

4. A centrifugal molding apparatus as claimed in claim 1, wherein said three resin-liquid dispensers are each provided with a resin feed nozzle, which has, centrally on its end, a first resin-liquid jet opening, an air jet opening outside the periphery of said jet opening and a second resin-liquid jet opening outside the periphery of said air jet opening, there being provided, between said air jet opening and said second resin-liquid jet opening, an annular groove having an inverted V profile.

5. An apparatus as claimed in claim 2, wherein another air jet opening is provided on the wall of said groove.

6. An apparatus as claimed in claim 1, wherein said press roll member comprises at least one press roll shaft mounted to a contractibly extensible mechanism, and a roll rotatably mounted to said press roll shaft.

7. An apparatus as claimed in claim 4, wherein said roll comprises a ring member rotatably mounted to said press roll shaft, a resilient member laminated on the outer periphery of said ring member, and a flexible member covering said resilient member, said roll's outer peripheral edge, on the front-end side of said operating arm means, being tapered to form a tapered surface.

8. An apparatus as claimed in claim 1 wherein said screw conveyor includes an axial shaft having an air passage in its interior and having air jet openings at a plurality of locations along the axis, and a screw vane mounted on said shaft and having a relatively narrow pitch adjacent said discharge port.

9. An apparatus as claimed in claim 8 wherein a plurality of restrictor plates are provided at said discharge port.

10. An apparatus as claimed in claim 1, wherein said air nozzles are provided on both sides of said screw shaft, said air nozzles being so inclined that their openings are positioned in opposed relation.

* * * * *

UNITED STATES PATENT AND TRADEMARK OFFICE
CERTIFICATE OF CORRECTION

PATENT NO. : 4,358,264
DATED : November 9, 1982
INVENTOR(S) : MASAHIKO YAMAMOTO ET AL It is certified that error appears in the above—identified patent and that said Letters Patent is hereby corrected as shown below:

Column 7, line 33, "to" should read -- at --.
Column 9, line 64, before "part" insert -- a --.
Column 12, line 64, "arms" should read -- arm --.
Column 13, line 18, "2" should read -- 4 --.
Column 14, line 3, "4" should read -- 6 --.
line 19, "1" should read -- 8 --.
line 20, after "said", insert -- sand discharge port in the longitudinal direction of said --.

Signed and Sealed this

Ninth Day of August 1983

[SEAL]

Attest:

GERALD J. MOSSINGHOFF

*Attesting Officer*     *Commissioner of Patents and Trademarks*